(12) United States Patent
Lamba et al.

(10) Patent No.: US 11,301,583 B2
(45) Date of Patent: Apr. 12, 2022

(54) METHOD AND SYSTEM FOR PROTECTION OF CUSTOMER PII VIA CRYPTOGRAPHIC TOKENS

(71) Applicant: MASTERCARD INTERNATIONAL INCORPORATED, Purchase, NY (US)

(72) Inventors: Rahul Lamba, Uttar Pradesh (IN); Aastha Dhiman, Himachal Pradesh (IN); Tushar Rungta, Haryana (IN); Aditya Koduri, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 365 days.

(21) Appl. No.: 16/596,856

(22) Filed: Oct. 9, 2019

(65) Prior Publication Data

US 2021/0110057 A1  Apr. 15, 2021

(51) Int. Cl.
*G06F 21/00* (2013.01)
*G06F 21/62* (2013.01)
(Continued)

(52) U.S. Cl.
CPC ............ *G06F 21/6245* (2013.01); *H04L 9/30* (2013.01); *H04L 9/3249* (2013.01); *H04L 2209/38* (2013.01)

(58) Field of Classification Search
CPC ....... G06F 21/6245; G06F 21/64; H04L 9/30; H04L 9/3249; H04L 2209/38;
(Continued)

(56) References Cited

U.S. PATENT DOCUMENTS 6,510,513 B1 * 1/2003 Danieli .................. G06F 21/64
380/279
7,328,351 B2 * 2/2008 Yokota ................ H04L 63/0464
713/176
(Continued)

FOREIGN PATENT DOCUMENTS

AU     2004232072 A1 * 11/2004 ............. G06Q 30/06
CA        3045670 A1 *  6/2018 ........... H04L 9/3239
(Continued)

*Primary Examiner* — John B King
(74) *Attorney, Agent, or Firm* — Buchanan Ingersoll & Rooney PC

(57) ABSTRACT

A method for facilitating communications while protecting customer privacy through cryptography and withholding of personally identifiable information includes: storing, in a memory of a processing server, contact data and a reference value associated with a first external computing device; receiving, by a receiver of the processing server, a communication request from a second external computing device, the communication request including at least the reference value and a digital signature; validating, by a processor of the processing server, the digital signature using a communicator public key of a cryptographic key pair; receiving, by the receiver of the processing server, a communication message from the second external computing device; and forwarding, by a transmitter of the processing server, the communication message to the first external computing device using the stored contact data following successful validation of the digital signature.

14 Claims, 6 Drawing Sheets

(51) Int. Cl.
*H04L 9/30* (2006.01)
*H04L 9/32* (2006.01)

(58) Field of Classification Search
CPC .............. H04L 2209/42; H04L 9/3239; H04L 63/0421; H04L 63/126; H04L 9/3247; H04W 12/02; H04W 12/03
See application file for complete search history.

(56) References Cited

U.S. PATENT DOCUMENTS

| | | | | |
|---|---|---|---|---|
| 10,474,834 | B1 * | 11/2019 | Frensch | H04L 9/3213 |
| 10,630,669 | B2 * | 4/2020 | Matute | H04L 63/0807 |
| 2003/0028599 | A1 * | 2/2003 | Kolsky | H04L 61/157 |
| | | | | 709/206 |
| 2003/0172090 | A1 * | 9/2003 | Asunmaa | G06F 21/31 |
| 2003/0217261 | A1 * | 11/2003 | Yokota | H04L 51/00 |
| | | | | 713/153 |
| 2004/0058694 | A1 * | 3/2004 | Mendiola | H04M 3/5322 |
| | | | | 455/466 |
| 2004/0209597 | A1 * | 10/2004 | Myles | H04L 63/101 |
| | | | | 455/410 |
| 2007/0168501 | A1 * | 7/2007 | Cobb | G06Q 30/02 |
| | | | | 709/224 |
| 2009/0037982 | A1 * | 2/2009 | Wentker | G06Q 20/385 |
| | | | | 726/3 |
| 2009/0124270 | A1 * | 5/2009 | Kelley | H04W 8/26 |
| | | | | 455/466 |
| 2011/0143713 | A1 * | 6/2011 | Luft | H04L 63/04 |
| | | | | 455/411 |
| 2011/0252104 | A1 * | 10/2011 | Nachum | H04L 63/02 |
| | | | | 709/206 |
| 2013/0263226 | A1 * | 10/2013 | Sudia | G06F 21/60 |
| | | | | 726/4 |
| 2014/0101161 | A1 * | 4/2014 | Khalil | G06Q 10/107 |
| | | | | 707/738 |
| 2017/0046181 | A1 * | 2/2017 | Williams | H04L 63/0823 |
| 2017/0230353 | A1 * | 8/2017 | Kurian | H04L 63/08 |
| 2017/0230375 | A1 * | 8/2017 | Kurian | H04L 63/102 |
| 2018/0077133 | A1 * | 3/2018 | Matute | H04L 63/0807 |
| 2018/0139574 | A1 * | 5/2018 | Senger | H04W 4/029 |
| 2019/0109709 | A1 * | 4/2019 | Wu | H04L 9/3236 |
| 2020/0127828 | A1 * | 4/2020 | Liu | H04L 9/0637 |
| 2021/0029121 | A1 * | 1/2021 | Kurian | H04L 63/083 |

FOREIGN PATENT DOCUMENTS

| | | | | |
|---|---|---|---|---|
| CN | 1439207 A | * | 8/2003 | ............ H04L 9/3265 |
| CN | 101292549 A | * | 10/2008 | ............ H04L 67/24 |
| CN | 101383815 A | * | 3/2009 | |
| JP | 2013171473 A | * | 9/2013 | |
| KR | 20070011060 A | * | 1/2007 | ............ G06Q 10/10 |
| WO | WO-0072246 A1 | * | 11/2000 | ............ G06K 17/00 |

* cited by examiner

METHOD AND SYSTEM FOR PROTECTION OF CUSTOMER PII VIA CRYPTOGRAPHIC TOKENS

FIELD

The present disclosure relates to protecting customer personally identifiable information (PII) via the use of cryptographic information, specifically the use of cryptography to enable a service provider to contact a customer through an intermediary without revealing customer information to the service provider.

BACKGROUND

In recent years, improvements in technology have resulted in a vast number of services that are available to consumers through the use of third party providers and others that are not directly approached by the customer. For instance, in one example, rideshare services enable a customer that needs a ride somewhere to request one via an application program, with an available driver being contacted and confirmed on behalf of the customer. In another example, many restaurants now provide delivery through a third party engaged via a third party application program. In these cases, a third party service provider with no connection to the customer can provide them with a valuable service that is convenient and economical.

However, these services are often connected to the customer via use of their phone number or other personally identifiable information. The application program provides the customer's phone number to the service provider, so that the service provider can contact the customer directly should they have any questions or need assistance. However, many customers may be uncomfortable with the service provider receiving such personal information. In such cases, the customer is faced with a choice: surrender their personal information to the unknown service provider or refuse to take advantage of the service.

Thus, there is a need for a technical solution to enable a customer to be put in communication with a third party service provider without the service provider being given any access to the customer's personally identifiable information.

SUMMARY

The present disclosure provides a description of systems and methods for facilitating communications while protecting customer privacy through cryptography and withholding of personally identifiable information. A service provider has a cryptographic key pair that they generate, with the private key of the key pair being stored on their device. When they want to contact a customer regarding services, they generate a digital signature with their private key to be included with their desired communication. The data is provided to a server, which validates the digital signature using the public key of the key pair, to authenticate the identity of the service provider. If the service provider is authenticated and has permission to contact the customer (e.g., given by the customer themselves or through a platform used for the service), then the server may forward the communication to the customer's device, such as by forwarding on a short messaging service message, initiating a telephone call between the two devices, etc. The result is that the service provider can contact the customer when necessary, but without being provided or having access to any personally identifiable information of the customer.

A method for facilitating communications while protecting customer privacy through cryptography and withholding of personally identifiable information includes: storing, in a memory of a processing server, contact data and a reference value associated with a first external computing device; receiving, by a receiver of the processing server, a communication request from a second external computing device, the communication request including at least the reference value and a digital signature; validating, by a processor of the processing server, the digital signature using a communicator public key of a cryptographic key pair; receiving, by the receiver of the processing server, a communication message from the second external computing device; and forwarding, by a transmitter of the processing server, the communication message to the first external computing device using the stored contact data following successful validation of the digital signature.

A system for facilitating communications while protecting customer privacy through cryptography and withholding of personally identifiable information includes: a first external computing device; a second external computing device; and a processing server, the processing server including a transmitter, a memory storing contact data and a reference value associated with a first external computing device, a receiver receiving a communication request from a second external computing device, the communication request including at least the reference value and a digital signature, and a processor validating the digital signature using a communicator public key of a cryptographic key pair, wherein the receiver of the processing server further receives a communication message from the second external computing device, and the transmitter of the processing server transmits the communication message to the first external computing device using the stored contact data following successful validation of the digital signature.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Facilitating Communications and Protecting Customer Privacy

Figure 1:
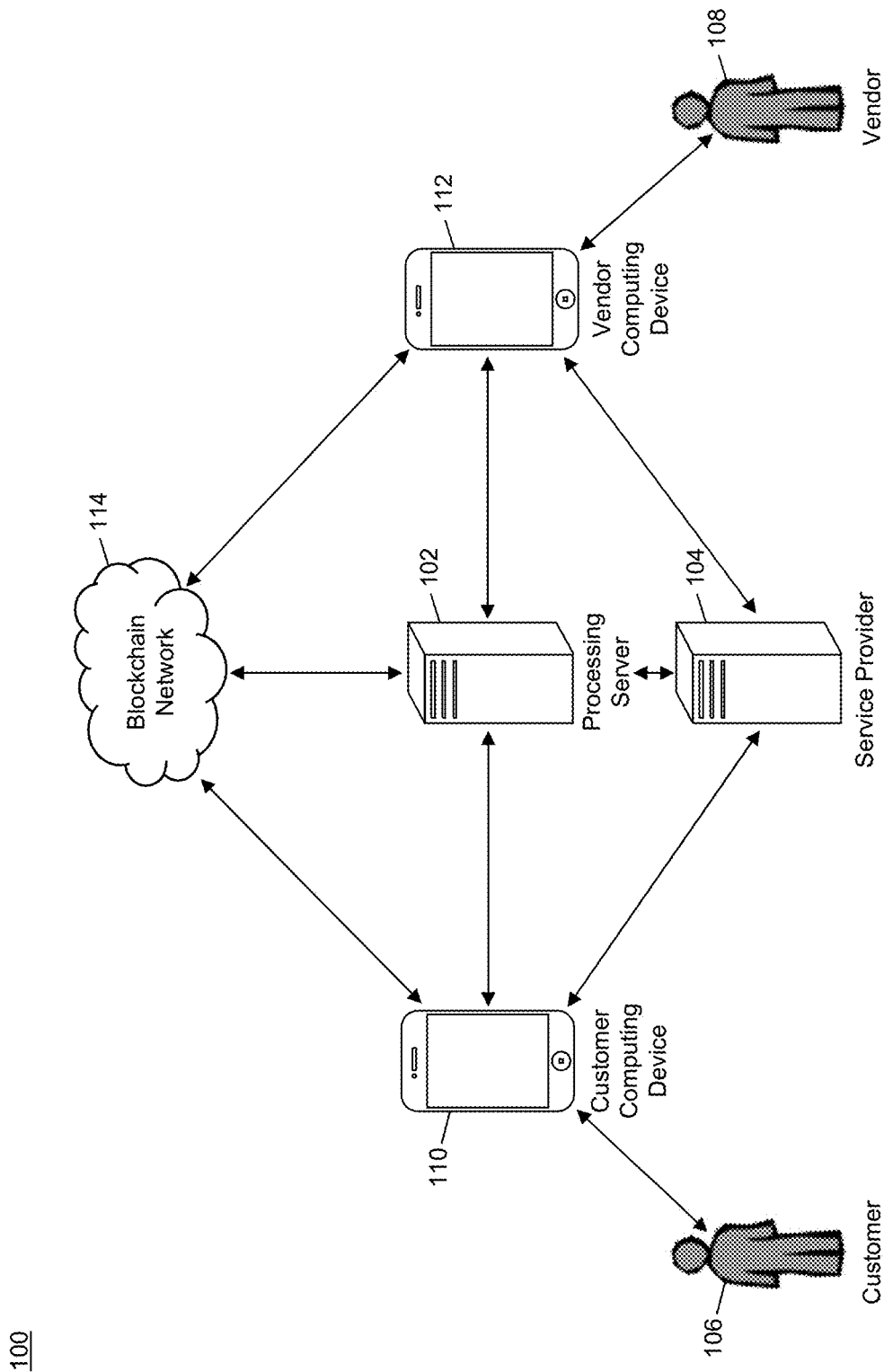
FIG. 1 is a block diagram illustrating a high level system architecture for facilitating communications while protecting customer privacy in accordance with exemplary embodiments.

FIG. 1 illustrates a system 100 for the facilitating of communications between a customer and vendor as a service provider while protecting the customer's personally identifiable information (PII) through the use of cryptography.

The system 100 may include a processing server 102. The processing server 102, discussed in more detail below, may be configured to facilitate communications between a customer 106 and a vendor 108 in the system 100 while protecting the customer's PII. In the system 100, the customer 106 may have a customer computing device 110. The customer computing device 110 may be any type of computing device suitable for performing the functions discussed herein, such as a specially configured desktop computer, tablet computer, notebook computer, laptop computer, cellular phone, smart phone, smart watch, smart television, wearable computing device, implantable computing device, etc. The customer 106 may, using their customer computing device 110, request a service from a service provider 104.

The service provider 104 may identify the vendor 108 as being available to provide the service to the customer 106. For instance, in one example, the service provider 104 may be a rideshare service, where the vendor 108 may be a driver that is available to pick up the customer 106 and take them to a selected destination. In another example, the vendor 108 may be a driver that is available to pick up a meal at a restaurant for delivery to the customer 106. In a third example, the vendor 108 may be a mechanic that is available to assist the customer 106 with repairs to their vehicle. The service provider 104 may contact the vendor 108 via a vendor computing device 112. The vendor computing device 112 may be any type of computing device suitable for performing the functions of the vendor computing device 112 as discussed herein, such as a specially configured computing device similar to those that may be used as the customer computing device 110. In some embodiments, the processing server 102 may be configured to perform the functions of the service provider 104 as discussed herein.

In an exemplary embodiment, the vendor computing device 112 may be provided with any information necessary to enable the vendor 108 to provide the service to the customer 106. For instance, if the service provider 104 is for ridesharing, the service provider 104 may provide the vendor 108 with the address for pickup of the customer 106 and address of the destination of the customer 106 via the vendor computing device 112, without providing any additional information regarding the customer 106. The vendor 108 may then be able to provide the service to the customer 106.

However, a situation may arise where the vendor 108 may be interested in communicating with the customer 106. At the same time, the customer 106 may be wary of providing PII to the vendor 108. For instance, the customer 106 may not want to provide their phone number of their customer computing device 110 to the vendor 108 so that the vendor 108 may not be able to contact them once the service has been provided. Similarly, the customer 106 may not want to reveal their name or other information out of concern for identity theft, personal security, etc. However, the customer 106 may still be interested in having the vendor 108 be able to contact them. For example, the customer 106 awaiting a rideshare may be open to contact to provide the vendor 108 with assistance in locating them for pickup or being apprised of any delays.

The processing server 102 may be used to facilitate such communication. When the service is requested by the customer 106, a reference value may be established. The reference value may be any value that is unique to the instance of the service being provided to the customer 106, such as an identification number, alphanumeric value, etc. In some cases, the reference value may be provided by the customer 106 when requesting the service. In other cases, the service provider 104 may generate or otherwise identify the reference value, which may be provided back to the customer computing device 110. The service provider 104 may provide the reference value to the vendor computing device 112. The vendor 108 may then use that reference value when contacting the service provider 104 or processing server 102 regarding the providing of the service to the customer 106.

The vendor computing device 112 may include a cryptographic key pair. The cryptographic key pair may include a private key and public key, referred to herein as a "communicator" key pair and a "communicator" private key and public key for the keys associated with the vendor 108. The cryptographic key pair may be generated using any suitable key generation algorithm. The vendor's public key may be provided to the processing server 102. In some cases, the vendor computing device 112 may provide the public key to the processing server 102. In other cases, the communicator public key may be stored in the service provider 104, where the service provider 104 may provide the public key to the processing server 102 when the vendor 108 is selected to provide the service to the customer 106. For instance, the service provider 104 may provide the reference value and public key both to the processing server 102, which may establish the vendor 108 as the approved provider of the service to the customer 106. In another case, the service provider 104 may provide the communicator public key to the customer 106 via the customer computing device 110 when the customer requests the service. In such cases, the customer 106 may provide the communicator public key and reference value to the processing server 102, which may service to validate the vendor 108 as the approved provider of the service.

When the vendor 108 wants to communicate with the customer 106, the vendor 108 may submit a communication request to the processing server 102 using their vendor computing device 112. The communication request may include at least the reference value and a digital signature. The digital signature may be generated using the communicator private key by the vendor computing device 112, which may be generated using any suitable signature generation algorithm. The processing server 102 may receive the reference value and the digital signature, and attempt a validation of the digital signature. The processing server 102 may identify the communicator public key that is associated with the reference value, and attempt to validate the digital signature using the communicator public key and the signature generation algorithm. If the validation is unsuccessful, then it may be implied that the vendor 108 is not the selected and authorized provider, or is using an unauthorized vendor computing device 112. If the validation is successful, then the vendor 108 and/or vendor computing device 112 are authenticated and validated as being the authorized provider of the service. Upon successful validation, the processing server 102 may establish communication between the vendor computing device 112 and the customer computing device 110.

The communication may be established using any suitable communication network and method, which may be dependent on the choices of the customer 106 and/or vendor 108. For instance, the customer 106 may authorize text communications but may not authorize any voice communications. Similarly, the vendor 108 may specify preferences or requirements regarding communication. For example, if the customer 106 allows only text communications, and the vendor 108 allows only voice communications, then any attempt at communication may be unsuccessful. If the requested communication is via text, the processing server 102 may forward a data message from the vendor computing device 112 to the customer computing device 110 using a suitable text communication channel, such as via e-mail, short messaging service, multimedia messaging service, etc. If the requested communication is via voice, then the processing server 102 may initiate a telephone call between the customer computing device 110 and the vendor computing device 112 in a manner that may prevent access to the telephone number of the customer computing device 110 by the vendor computing device 112. In any instance, the processing server 102 may thus establish communication between the vendor 108 and customer 106, without the vendor 108 or vendor computing device 112 having any access to PI of the customer 106.

In some embodiments, the customer 106 may be required (e.g., by the processing server 102 or based on preferences of the customer 106, such as when requesting the service from the service provider 104 and/or processing server 102) to provide authorization for any communication to be received from a vendor 108. In such embodiments, when the processing server 102 receives a communication request, the processing server 102 may transmit a request for authorization to the customer computing device 110. The customer computing device 110 may then respond (e.g., based on instructions provided by the customer 106) providing their approval or denial of the attempted communication. If communication is denied, the processing server 102 may respond accordingly to the request to the vendor computing device 112. If the communication is approved, then, if the vendor 108 is successfully authenticated and validated, the communication may be forwarded and/or established. In some cases, the customer's providing of the communicator public key and reference value to the processing server 102 may serve as authorization for communication.

In some embodiments, the customer 106 may also have a cryptographic key pair generated by the customer computing device 110 for use in the system 100, also referred to herein as a "customer" key pair including a "customer" private key and a "customer" public key. In such embodiments, the customer 106 may generate a digital signature on their customer computing device 110 that is included in transmissions made to the processing server 102. For instance, when the customer 106 provides authorization for a communication, the authorization may include a digital signature generated using the customer private key. The processing server 102 may use the customer public key to validate the digital signature, where successful validation may be required before any communication is forwarded to the customer computing device 110.

Figure 5:
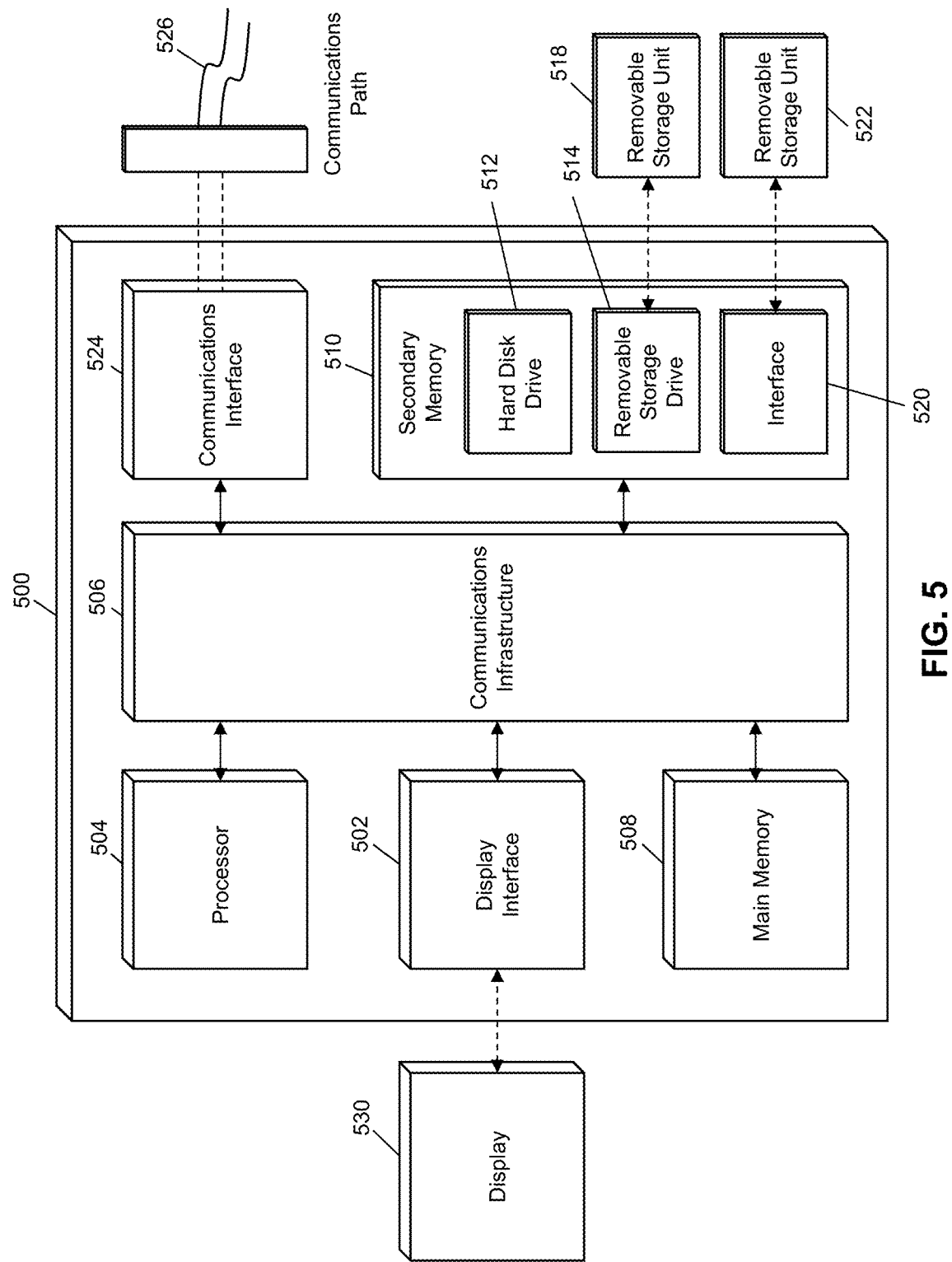
FIG. 5 is a block diagram illustrating a computer system architecture in accordance with exemplary embodiments.

In some embodiments, the system 100 may include a blockchain network 114. The blockchain network 114 may include a plurality of blockchain nodes (not shown). Each blockchain node may be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network prior to the generation and addition of a new block to the blockchain in order for the change to be made permanent. Computational and communication limitations may make such a modification exceedingly difficult, if not impossible, thus rendering the blockchain immutable.

Blockchain data values may include information regarding services being provided in the system 100. For instance, when the service provider 104 selects a vendor 108 for providing of the requested service to the customer 106, then the reference value and the communicator public key may be stored in a new blockchain data value that is stored in the blockchain. In such cases, the reference value and communicator public key may be submitted to a node in the blockchain network 114 by the service provider 104 or by the processing server 102. In some embodiments, the processing server 102 may be a node in the blockchain network 114. In some cases, customer authorization for communications from vendors 108 may also be stored in the blockchain. For example, the customer 106 may submit their authorization via the customer computing device 110 to a blockchain node, where the authorization includes the reference value and the digital signature generated using the customer private key. In some cases, the reference value, communicator public key, and customer digital signature may all be included in one submission to the blockchain network 114 by the customer computing device 110, which may be used by the processing server 102 for validating the communication request and having authorization from the customer 106.

The methods and systems discussed herein enable communications between a vendor 108 and a customer 106 to occur in cases where the vendor 108 is a third party service provider, without the customer 106 having to surrender any PII. The processing server 102 acts as an intermediary that can validate and authenticate vendors 108 as being authorized service providers and establish communications with the customer 106 only in authorized instances, and can do so without any PI being provided to or even made available to the vendor 108 or the vendor computing device 112. As a result, communication can occur between the customer 106 and vendor 108 if necessary for a service, but without the customer 106 having to sacrifice any PI or be subject to any communications once the service has been provided and completed. The result is a system that provides all of the convenience that customers 106 and vendors 108 rely on, without sacrificing any privacy.

Processing Server

Figure 2:
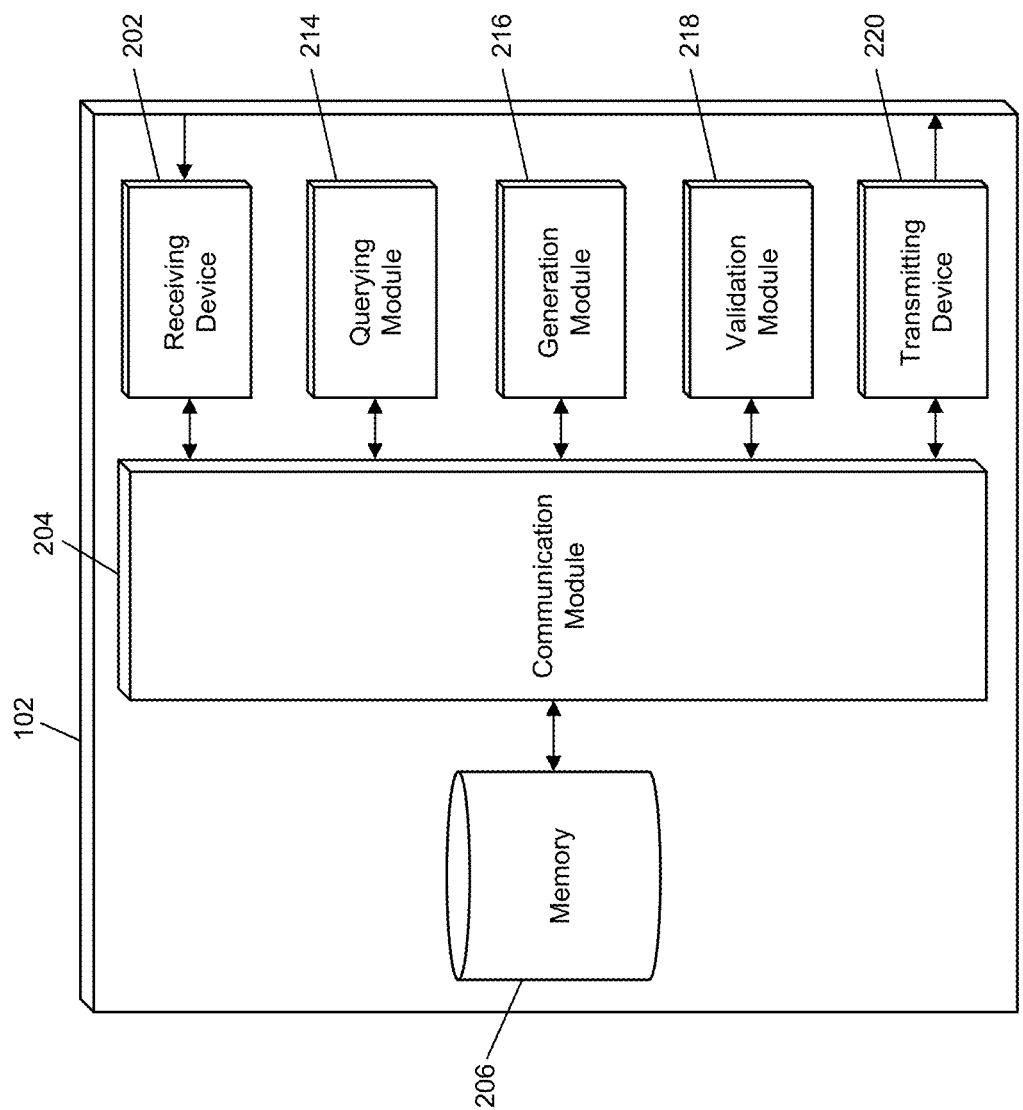
FIG. 2 is a block diagram illustrating the processing server of the system of FIG. 1 for facilitating communications while protecting customer privacy in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from service providers 104, customer computing devices 110, vendor computing devices 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by service providers 104 and customer computing devices 110 that may be superimposed or otherwise encoded with reference values, contact data for customer computing devices 110, and communicator public keys. The receiving device 202 may also be configured to receive data signals electronically transmitted by customer computing devices 110 that are superimposed or otherwise encoded with communication authorizations, which may include customer digital signatures and/or customer public keys. The receiving device 202 may be further configured to receive digital signatures electronically transmitted by vendor computing devices 112, which may be superimposed or otherwise encoded with communication requests, which may include reference values and communicator digital signatures.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include a memory 206. The memory 206 may be configured to store data for use by the processing server 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein. The memory 206 may be configured to store, for example, cryptographic keys, salts, nonces, communication information for blockchain nodes and blockchain networks 114, communication information for service providers, key signature generation algorithms, communication protocols and network information, customer preferences regarding communications, communicator and customer public keys, reference values, etc.

The processing server 102 may include a querying module 214. The querying module 214 may be configured to execute queries on databases to identify information. The querying module 214 may receive one or more data values or query strings, and may execute a query string based thereon on an indicated database, such as the memory 206 of the processing server 102 to identify information stored therein. The querying module 214 may then output the identified information to an appropriate engine or module of the processing server 102 as necessary. The querying module 214 may, for example, execute a query on the memory 206 to identify a communicator public key associated with a reference value for use in validating a communication request that includes the reference value.

The processing server 102 may also include a generation module 216. The generation module 216 may be configured to generate data for use by the processing server 102 in performing the functions discussed herein. The generation module 216 may receive instructions as input, may generate data based on the instructions, and may output the generated data to one or more modules of the processing server 102. For example, the generation module 216 may be configured to generate communications for forwarding, new blockchain data values for the blockchain, and other data for use in performing the functions discussed herein.

The processing server 102 may also include a validation module 218. The validation module 218 may be configured to perform validations for the processing server 102 as part of the functions discussed herein. The validation module 218 may receive instructions as input, which may also include data to be used in performing a validation, may perform a validation as requested, and may output a result of the validation to another module or engine of the processing server 102. The validation module 218 may, for example, be configured to validate digital signatures received from vendor computing devices 112, customer computing devices 110, the blockchain, etc.

The processing server 102 may also include a transmitting device 220. The transmitting device 220 may be configured to transmit data over one or more networks via one or more network protocols. In some instances, the transmitting device 220 may be configured to transmit data to service providers 104, customer computing devices 110, vendor computing devices 112, blockchain networks 114, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to service providers 104 that may be superimposed or otherwise encoded with communication information, public key requests, etc. The transmitting device 220 may be configured to electronically transmit data signals to customer computing devices 110 that are superimposed or otherwise encoded with requests for authorization of communications with a vendor 108. The transmitting device 220 may also be configured to electronically transmit data signals to vendor computing devices 112, which may be superimposed or otherwise encoded with data requests or notifications regarding attempted communications. The transmitting device 220 may be further configured to electronically transmit data signals to nodes in blockchain networks 114, such as may be superimposed or otherwise encoded with requests for blockchain data values or new blockchain data values for addition to the blockchain.

Process for Facilitating Communications without Exchange of PII

Figure 3A:
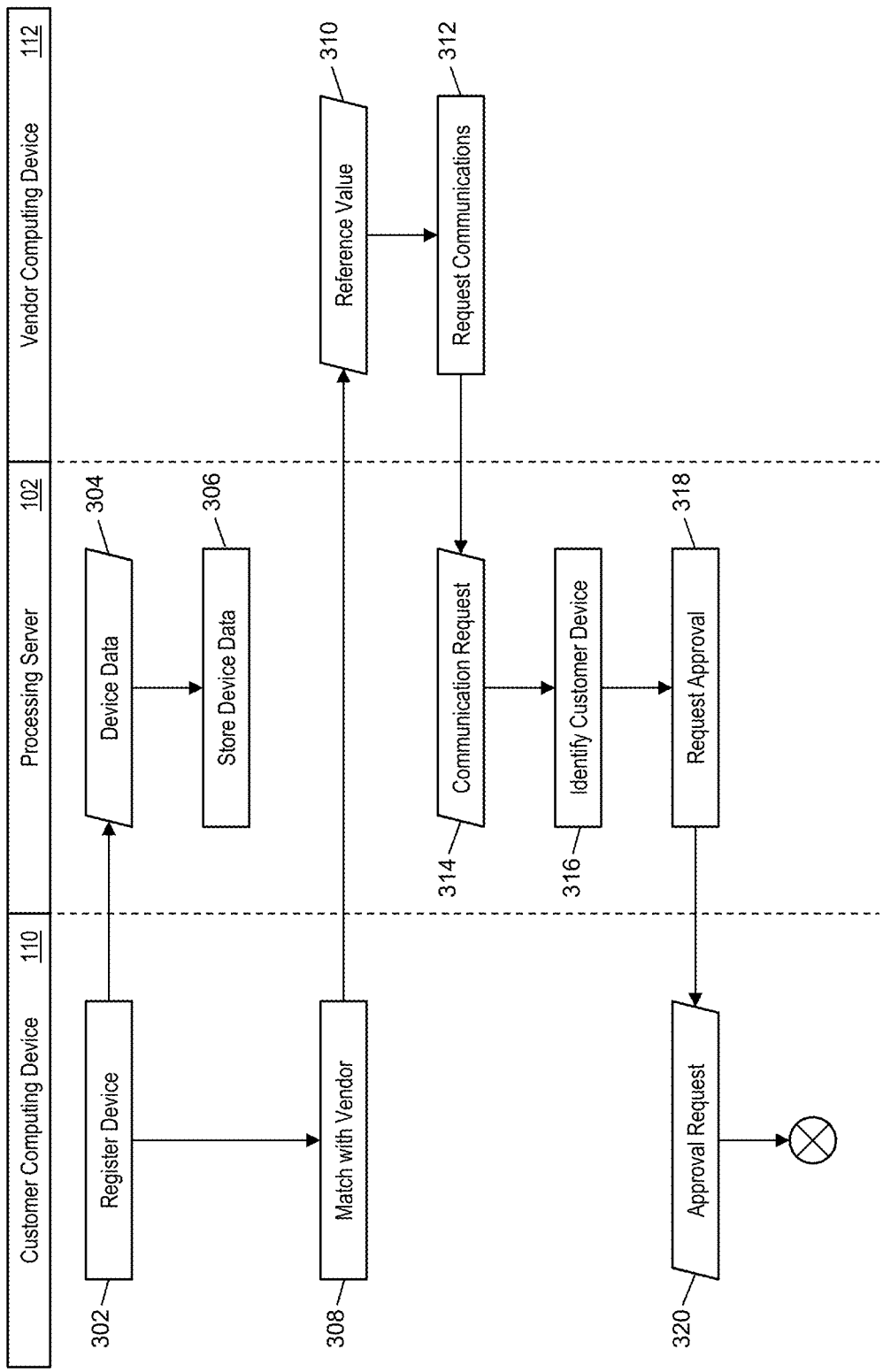
FIGS. 3A and 3B are a flow diagram illustrating a process for establishing communications between a customer and vendor while protecting customer privacy in the system of FIG. 1 in accordance with exemplary embodiments.
Figure 3B:
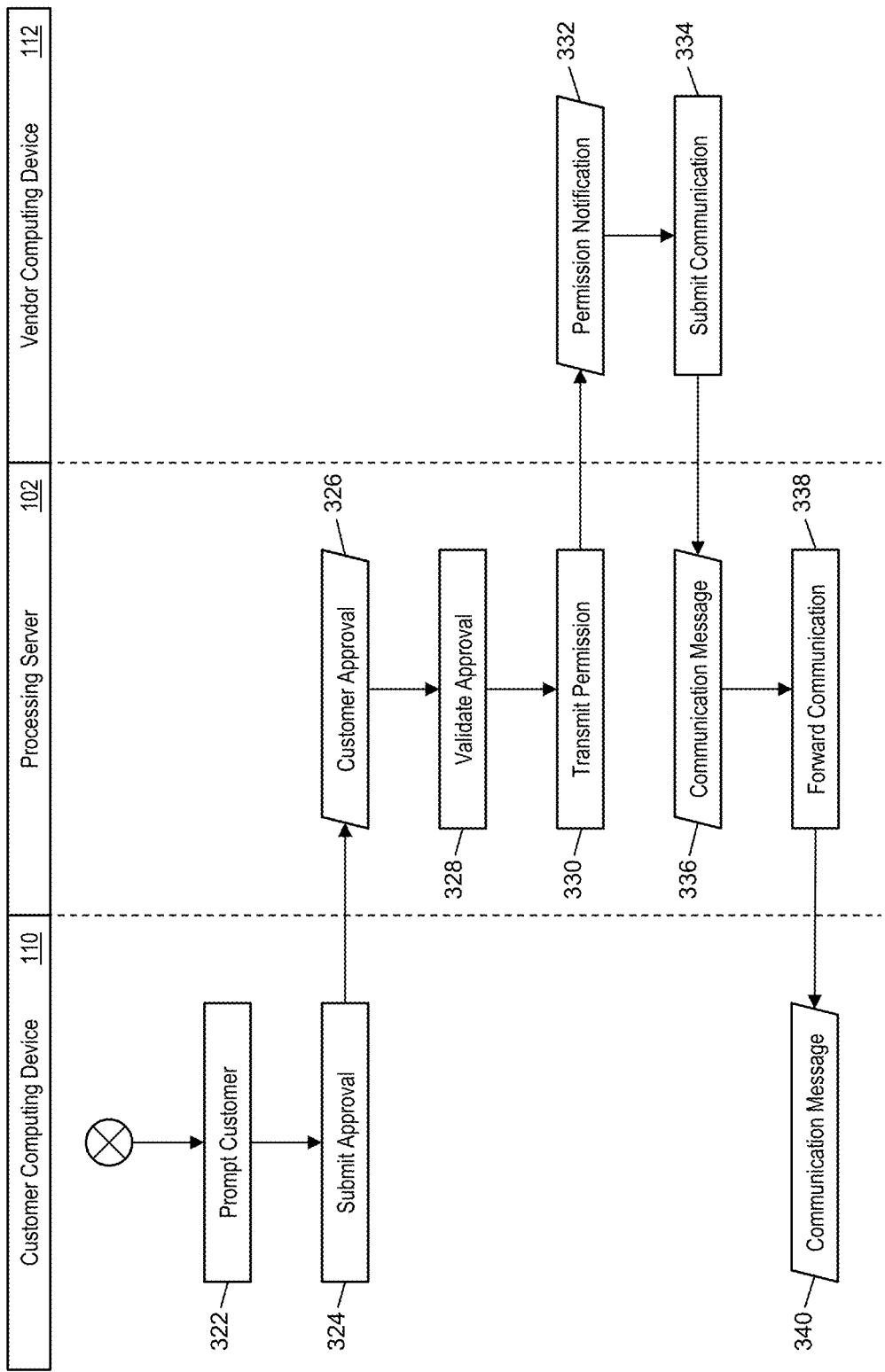

FIGS. 3A and 3B illustrate a process executed in the system 100 of FIG. 1 for the facilitating of communications between the customer computing device 110 and vendor computing device 112 by the processing server 102 without the exchange of any of the customer's personally identifiable information (PII).

In step 302, the customer 106 may register their customer computing device 110 with the processing server 102 for use in receiving communications from a vendor 108 during the providing of a service. Registration may include the transmission of contact data and a customer public key from the customer computing device 110. In step 304, the receiving device 202 of the processing server 102 may receive the contact data and customer public key. In step 306, the querying module 214 of the processing server 102 may execute a query on the memory 206 of the processing server 102 to store the contact data and customer public key therein.

In step 308, the customer 106 may contact the service provider 104 using the customer computing device 110 to request a service. The service provider 104 may collect any information from the customer 106 necessary for providing of the service, and then select a vendor 108 to provide the service to the customer 106. As part of the matching, the service provider 104 may provide a reference value to the customer computing device 110 for the instance of service, which may also be provided to the vendor computing device 112, received thereby, in step 310. The vendor computing device 112 may also receive any information necessary to provide the service to the customer 106, but may not be provided any PI of the customer 106.

In step 312, the vendor 108 may, using the vendor computing device 112, request to establish communications with the customer 106. The vendor computing device 112 may electronically submit a communication request to the processing server 102 using any suitable communication network and method, such as via an application programming interface of the processing server 102. The communication request may include at least the reference value for the instance of service and a digital signature generated by the vendor computing device 112 using the communicator private key. In step 314, the receiving device 202 of the processing server 102 may receive the communication request. As part of the receipt of the communication request, the validation module 218 of the processing server 102 may validate the communication request by validating the digital signature included therein using the communicator public key, which may be provided to the processing server 102 by the service provider 104 or the customer computing device 110 as part of the matching process. In step 316, the querying module 214 of the processing server 102 may execute a query on the memory 206 thereof to identify the contact data for the customer computing device 110 as associated with the reference value included in the communication request. In step 318, the transmitting device 220 of the processing server 102 may electronically transmit a request for approval to the customer computing device 110 using the identified contact data.

In step 320, the customer computing device 110 may include the request for approval, which may include at least the reference value for the instance of service to be provided. The request may be a request to approve the vendor 108 to communicate with the customer 106 regarding the service that is to be provided to the customer 106. In step 322, the customer computing device 110 may prompt the customer 106 to provide their approval of the communication request. In step 324, the customer computing device 110 may electronically transmit the approval of the communication request to the processing server 102 along with a digital signature generated using the customer private key. In step 326, the receiving device 202 of the processing server 102 may receive the customer's approval along with the digital signature.

In step 328, the validation module 218 of the processing server 102 may validate the customer's approval by validating the digital signature included in the approval using the customer public key that was provided during device registration, as associated with the reference value that was received prior to requesting the approval. Upon successful validation, in step 330, the transmitting device 220 of the processing server 102 may electronically transmit a notification to the vendor computing device 112 indicating that they are approved for communicating with the customer 106. In step 332, the vendor computing device 112 may receive the notification.

In step 334, the vendor computing device 112 may submit a communication message to the processing server 102 for forwarding to the customer 106. The communication message may include or otherwise be accompanied by the reference value for the instance of service being provided to the customer 106. In step 336, the receiving device 202 of the processing server 102 may receive the communication message. The querying module 214 of the processing server 102 may execute a query on the memory 206 thereof to identify the contact data associated with the received reference value and, in step 338, the transmitting device 220 of the processing server 102 may forward the communication message to the customer computing device 110 using the contact data. In step 340, the customer computing device 110 may receive the communication message, which may then be presented to the customer 106.

Figure 4:
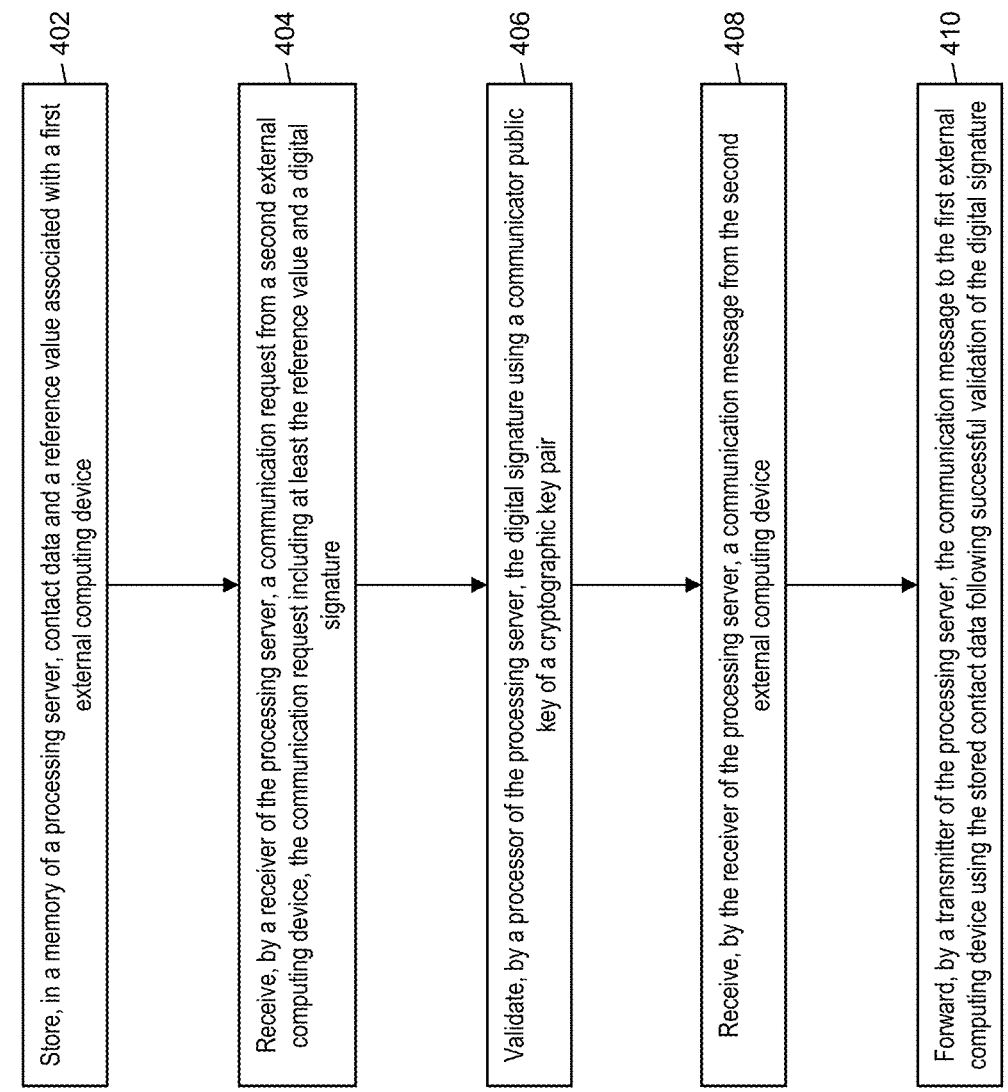
FIG. 4 is a flow chart illustrating an exemplary method for facilitating communications while protecting customer privacy in accordance with exemplary embodiments.

Exemplary Method for Facilitating Communications while Protecting Customer Privacy FIG. 4 illustrates a method 400 for facilitating communications between a customer and a vendor while protecting customer privacy through cryptography and withholding of personally identifiable information.

In step 402, contact data and a reference value associated with a first external computing device (e.g., the customer computing device 110) may be stored in a memory (e.g., the memory 206) of a processing server (e.g., the processing server 102). In step 404, a communication request may be received from a second external computing device (e.g., the vendor computing device 112) by a receiver (e.g., receiving device 202) of the processing server, the communication request including at least the reference value and a digital signature.

In step 406, the digital signature may be validated by a processor (e.g., validation module 218) of the processing server using a communicator public key of a cryptographic key pair. In step 408, a communication message may be received by the receiver of the processing server from the second external computing device. In step 410, the communication message may be forwarded by a transmitter (e.g., transmitting device 220) of the processing server 102 to the first external computing device using the stored contact data following successful validation of the digital signature.

In one embodiment, the method 400 may further include: transmitting, by the transmitter of the processing server, a permission request to the first external computing device following successful validation of the digital signature; and receiving, by the receiver of the processing server, a permission message from the first external computing device prior to forwarding the communication message. In some embodiments, the second external computing device may be prevented from receiving or obtaining the contact data.

In one embodiment, the method 400 may also include receiving, by the receiver of the processing server, an authorization message from the first external computing device, the authorization message including at least the communication public key. In a further embodiment, the method 400 may further include validating, by the processor of the processing server, a customer signature using a customer public key, wherein the authorization message further includes the customer signature. In an even further embodiment, the method 400 may even further include storing, in the memory of the processing server, the customer public key.

In some embodiments, the method 400 may also include receiving, by the receiver of the processing server, blockchain data for a blockchain, the blockchain data including a plurality of blocks, each block including one or more blockchain data values, where one of the blockchain data values included in one of the plurality of blocks includes at least the reference value and the communicator public key. In a further embodiment, the processing server may be a node of a plurality of nodes comprising a blockchain network (e.g., blockchain network 114), where the blockchain network operates and manages the blockchain.

Computer System Architecture

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for facilitating communications while protecting customer privacy through cryptography and withholding of personally identifiable information. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for facilitating communications while protecting customer privacy through cryptography and withholding of personally identifiable information, comprising:
   storing, in a memory of a processing server, contact data and a reference value associated with a first external computing device;
   receiving, by a receiver of the processing server, a communication request from a second external computing device, the communication request including at least the reference value and a digital signature;
   validating, by a processor of the processing server, the digital signature using a communicator public key of a cryptographic key pair;
   receiving, by the receiver of the processing server, a communication message from the second external computing device;
   forwarding, by a transmitter of the processing server, the communication message to the first external computing device using the stored contact data following successful validation of the digital signature;
   transmitting, by the transmitter of the processing server, a permission request to the first external computing device following successful validation of the digital signature; and
   receiving, by the receiver of the processing server, a permission message from the first external computing device prior to forwarding the communication message.

2. The method of claim 1, further comprising:
   receiving, by the receiver of the processing server, an authorization message from the first external computing device, the authorization message including at least the communication public key.

3. The method of claim 2, further comprising:
   validating, by the processor of the processing server, a customer signature using a customer public key, wherein
   the authorization message further includes the customer signature.

4. The method of claim 3, further comprising:
   storing, in the memory of the processing server, the customer public key.

5. The method of claim 1, further comprising:
   receiving, by the receiver of the processing server, blockchain data for a blockchain, the blockchain data including a plurality of blocks, each block including one or more blockchain data values, where one of the blockchain data values included in one of the plurality of blocks includes at least the reference value and the communicator public key.

6. The method of claim 5, wherein the processing server is a node of a plurality of nodes comprising a blockchain network, where the blockchain network operates and manages the blockchain.

7. The method of claim 1, wherein the second external computing device is prevented from receiving or obtaining the contact data.

8. A system for facilitating communications while protecting customer privacy through cryptography and withholding of personally identifiable information, comprising:
   a first external computing device;
   a second external computing device; and
   a processing server, the processing server including
      a transmitter,
      a memory storing contact data and a reference value associated with a first external computing device,
      a receiver receiving a communication request from a second external computing device, the communication request including at least the reference value and a digital signature, and
      a processor validating the digital signature using a communicator public key of a cryptographic key pair, wherein
   the receiver of the processing server further receives a communication message from the second external computing device,
   the transmitter of the processing server transmits the communication message to the first external computing device using the stored contact data following successful validation of the digital signature;
   wherein the transmitter of the processing server further transmits a permission request to the first external computing device following successful validation of the digital signature, and the receiver of the processing server further receives a permission message from the first external computing device prior to forwarding the communication message.

9. The system of claim 8, wherein the receiver of the processing server further receives an authorization message from the first external computing device, the authorization message including at least the communication public key.

10. The system of claim 9, wherein
the processor of the processing server further validates a customer signature using a customer public key, and
the authorization message further includes the customer signature.

11. The system of claim 10, wherein the memory of the processing server further stores the customer public key.

12. The system of claim 8, wherein the receiver of the processing server further receives blockchain data for a blockchain, the blockchain data including a plurality of blocks, each block including one or more blockchain data values, where one of the blockchain data values included in one of the plurality of blocks includes at least the reference value and the communicator public key.

13. The system of claim 12, wherein the processing server is a node of a plurality of nodes comprising a blockchain network, where the blockchain network operates and manages the blockchain.

14. The system of claim 8, wherein the second external computing device is prevented from receiving or obtaining the contact data.

* * * * *